(12) United States Patent
Lu et al.

(10) Patent No.: US 11,494,888 B2
(45) Date of Patent: Nov. 8, 2022

(54) WORK TERMINAL, OIL LEAKAGE DETECTION APPARATUS, AND OIL LEAKAGE DETECTION METHOD

(71) Applicant: Hitachi, Ltd., Tokyo (JP)

(72) Inventors: Li Lu, Tokyo (JP); Akira Nishimizu, Tokyo (JP); Toshiaki Rokunohe, Tokyo (JP); Akira Yamagishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 16/771,103

(22) PCT Filed: Nov. 5, 2018

(86) PCT No.: PCT/JP2018/040934
§ 371 (c)(1),
(2) Date: Jun. 9, 2020

(87) PCT Pub. No.: WO2019/142446
PCT Pub. Date: Jul. 25, 2019

(65) Prior Publication Data
US 2021/0192710 A1 Jun. 24, 2021

(30) Foreign Application Priority Data

Jan. 18, 2018 (JP) .............................. JP2018-006383
May 31, 2018 (JP) .............................. JP2018-104424

(51) Int. Cl.
*G06K 9/00* (2022.01)
*G06T 7/00* (2017.01)
(Continued)

(52) U.S. Cl.
CPC .............. *G06T 7/0004* (2013.01); *G01C 3/02* (2013.01); *G01M 3/38* (2013.01); *G01S 19/01* (2013.01);
(Continued)

(58) Field of Classification Search
None
See application file for complete search history.

(56) References Cited

U.S. PATENT DOCUMENTS

| 5,974,860 A | 11/1999 | Kuroda et al. |
| 2007/0268602 A1 | 11/2007 | Mori et al. |

(Continued)

FOREIGN PATENT DOCUMENTS

| CN | 106644276 A | * | 5/2017 |
| CN | 206223654 U |   | 6/2017 |

(Continued)

OTHER PUBLICATIONS

International Search Report (PCT/ISA/210) issued in PCT Application No. PCT/JP2018/040934 dated Jan. 22, 2019 with English translation (four (4) pages).

(Continued)

*Primary Examiner* — Sean M Conner
(74) *Attorney, Agent, or Firm* — Crowell & Moring LLP

(57) ABSTRACT

Provided is an oil leakage detection apparatus by which oil leakage detection is performed even for colorless oil with high detection accuracy and without complicating the apparatus. The oil leakage detection apparatus of the invention includes a distance measurement unit configured to measure a distance to the oil-input machine, an ultraviolet light source configured to irradiate the oil-input machine with ultraviolet light, a color imaging unit configured to capture an image of the oil-input machine irradiated with ultraviolet light, an image processing unit configured to diagnose oil leakage of the oil-input machine based on the distance measured by the distance measurement unit and the captured image of the color imaging unit, and a display unit configured to display a processed image processed by the image processing unit. Further, an oil leakage detection method of the invention includes measuring a distance from an oil- (Continued)

input machine, irradiating the oil-input device with ultraviolet light, capturing an image of the oil-input machine irradiated with ultraviolet light, diagnosing oil leakage of the oil-input machine based on the measured distance and the captured image, and displaying a processed image after the diagnosis processing.

14 Claims, 11 Drawing Sheets

(51) Int. Cl.
  *G01C 3/02* (2006.01)
  *G01M 3/38* (2006.01)
  *G01S 19/01* (2010.01)
(52) U.S. Cl.
  CPC ............ *G06T 2207/10024* (2013.01); *G06T 2207/10152* (2013.01)

(56) References Cited

U.S. PATENT DOCUMENTS

| | | | |
|---|---|---|---|
| 2016/0061665 A1* | 3/2016 | Chenault | G06V 10/145 356/51 |
| 2016/0191887 A1* | 6/2016 | Casas | G06F 3/017 348/47 |
| 2016/0275699 A1* | 9/2016 | Lu | H04N 9/0451 |
| 2017/0097274 A1* | 4/2017 | Thorpe | G01N 21/39 |
| 2017/0234762 A1* | 8/2017 | Lu | G01M 3/38 250/459.1 |
| 2017/0323479 A1 | 11/2017 | Mokuya | |
| 2018/0137652 A1 | 5/2018 | Lu et al. | |
| 2019/0050747 A1 | 2/2019 | Nakamura et al. | |
| 2019/0154439 A1* | 5/2019 | Binder | G01B 15/00 |
| 2019/0163165 A1* | 5/2019 | Gotou | G05B 23/0254 |

FOREIGN PATENT DOCUMENTS

| | | |
|---|---|---|
| JP | 7-64950 A | 3/1995 |
| JP | 9-304281 A | 11/1997 |
| JP | 10-311771 A | 11/1998 |
| JP | 11-344748 A | 12/1999 |
| JP | 2006-319401 A | 11/2006 |
| JP | 2014-167463 A | 9/2014 |
| JP | 2015-210113 A | 11/2015 |
| JP | 2016-82075 A | 5/2016 |
| JP | 2016-82462 A | 5/2016 |
| JP | 2016-90560 A | 5/2016 |
| WO | WO 2005/095993 A1 | 10/2005 |
| WO | WO-2016059812 A1 * 4/2016 ............ G01M 3/38 |
| WO | WO 2017/150263 A1 | 9/2017 |
| WO | WO 2017/154844 A1 | 9/2017 |

OTHER PUBLICATIONS

Japanese-language Written Opinion (PCT/ISA/237) issued in PCT Application No. PCT/JP2018/040934 dated Jan. 22, 2019 (seven (7) pages).
Taiwanese-language Office Action issued in Taiwanese Application No. 108101823 dated Dec. 30, 2019 with partial English translation (11 pages).
Japanese-language Office Action issued in Japanese Application No. 2018-104424 dated Aug. 31, 2021 with English translation (16 pages).

* cited by examiner

[FIG. 1]
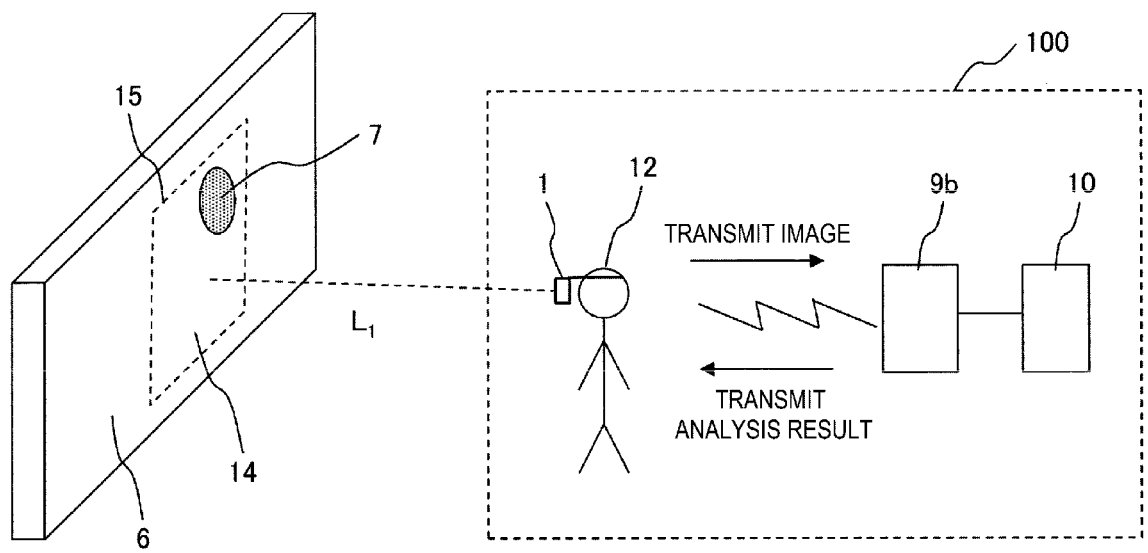
[FIG. 2]
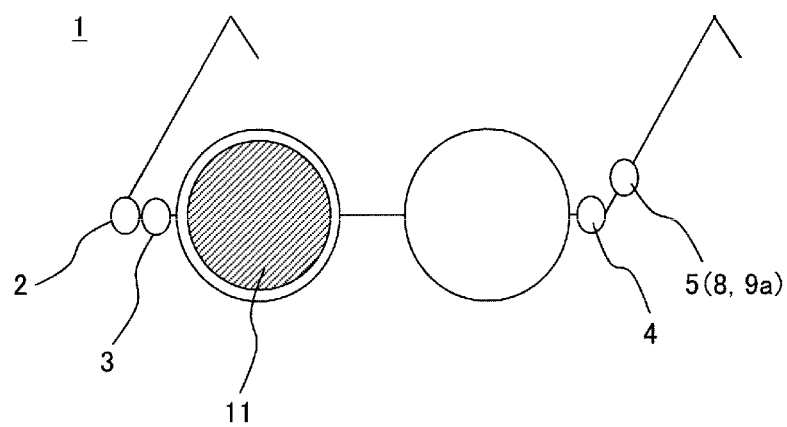

[FIG. 4]
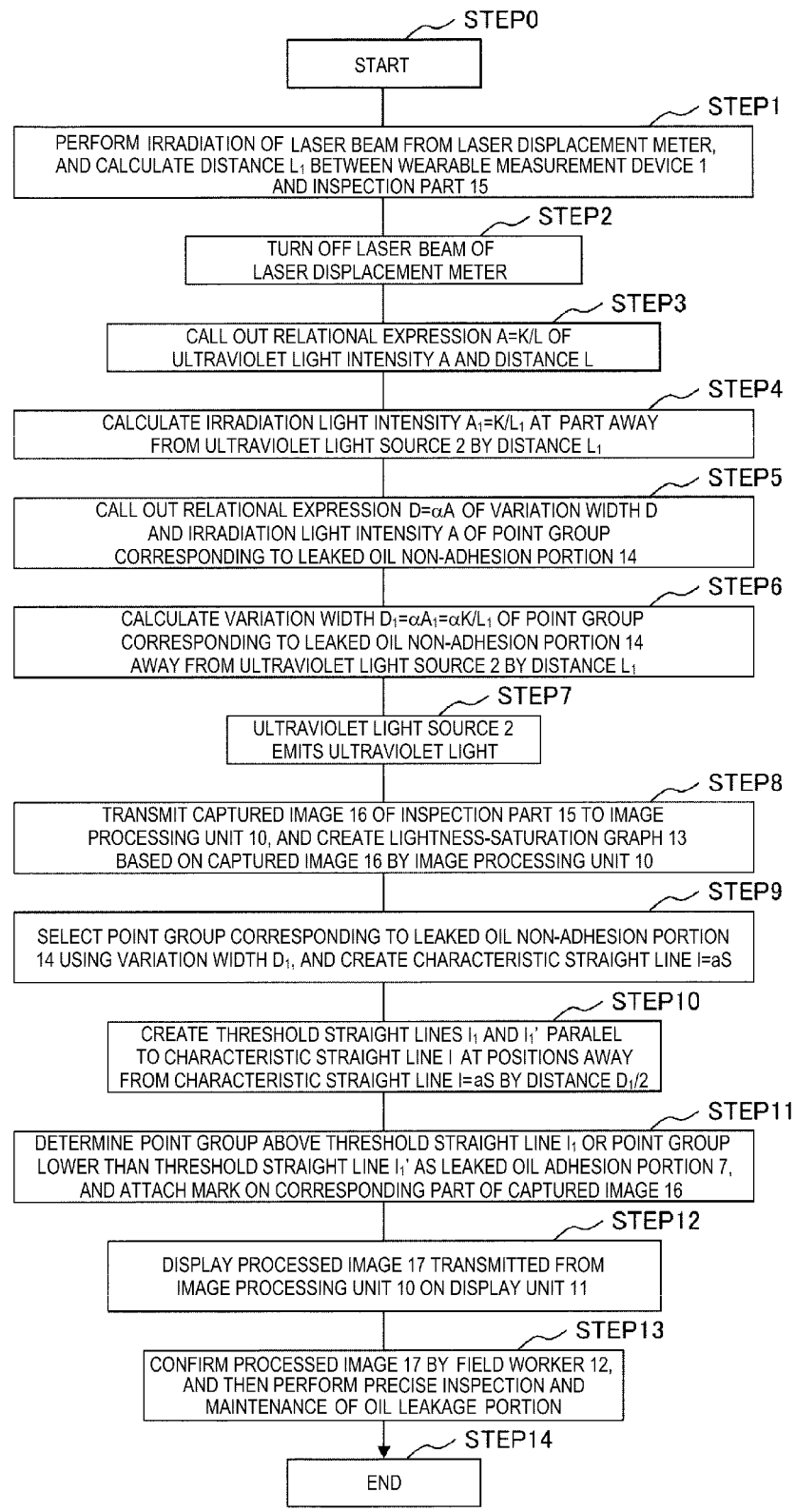

[FIG. 6]
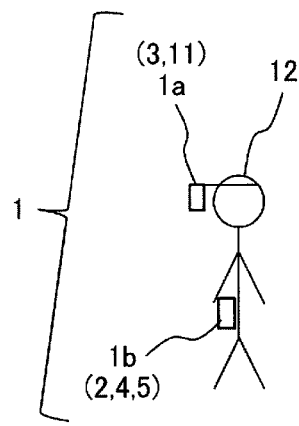
[FIG. 7]
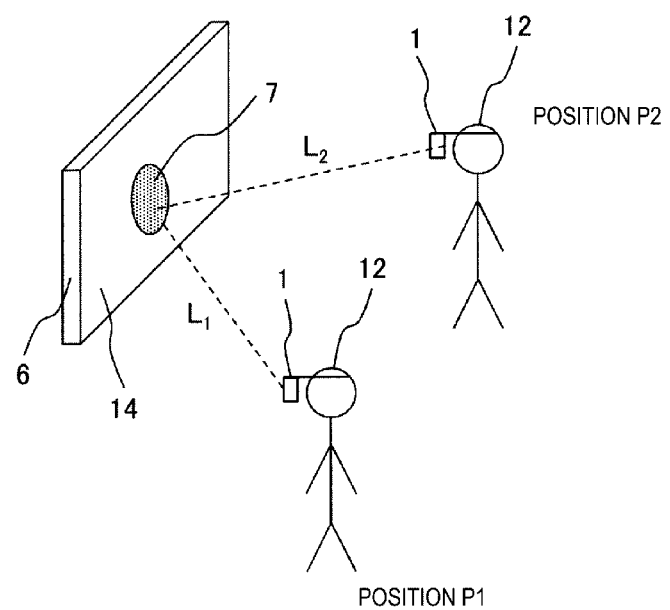

[FIG. 9]
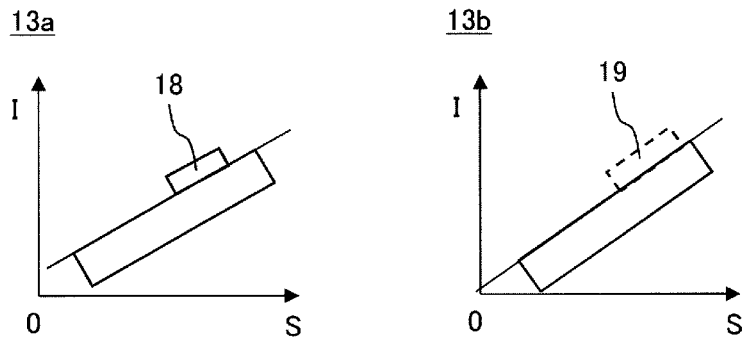
PRODUCT SET
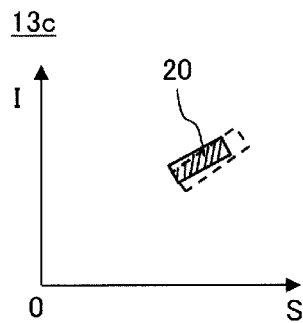
[FIG. 10]
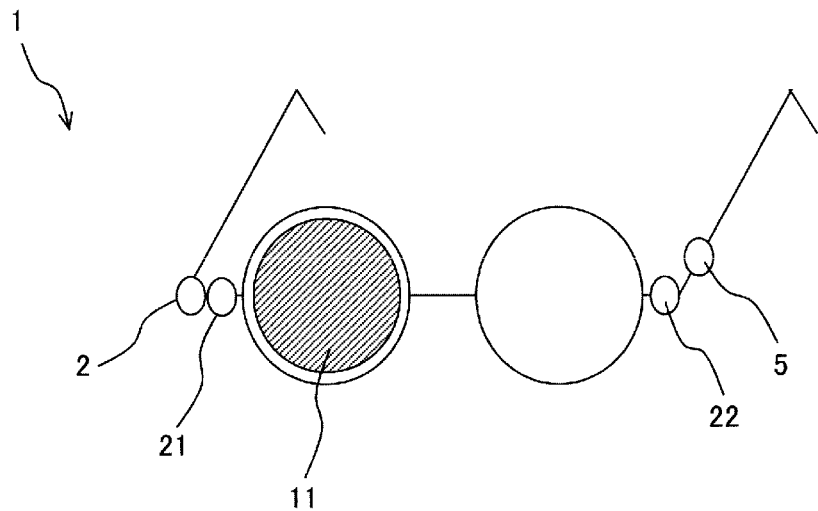

[FIG. 11]
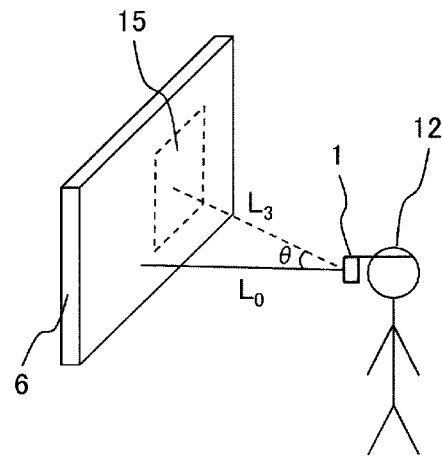
[FIG. 12]
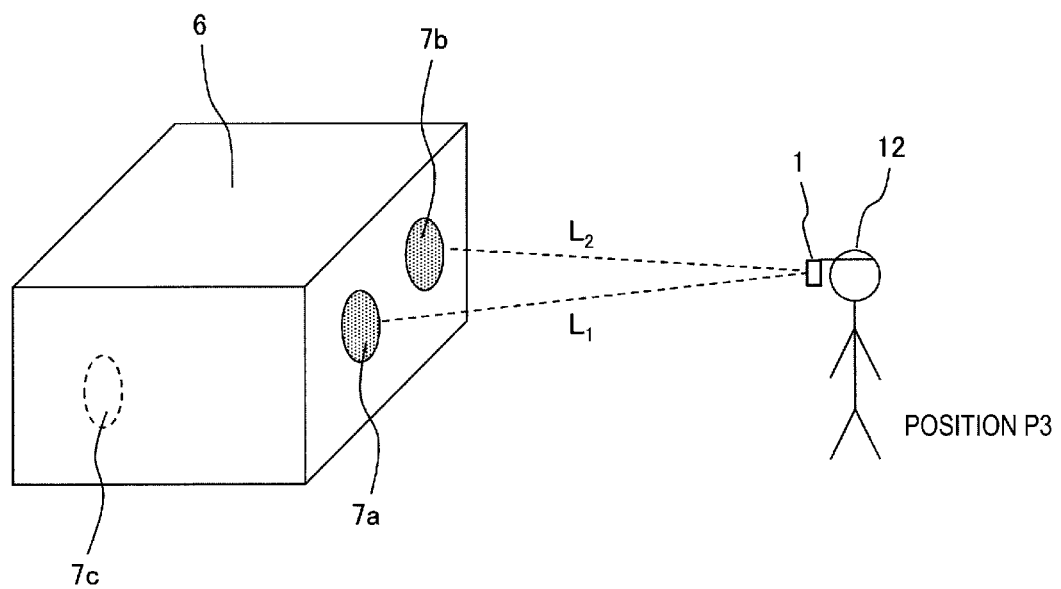

[FIG. 13]
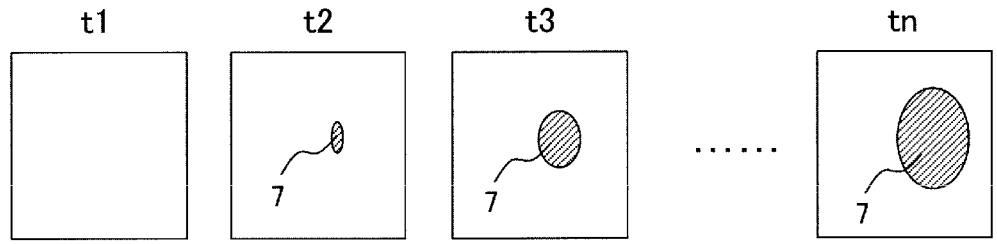
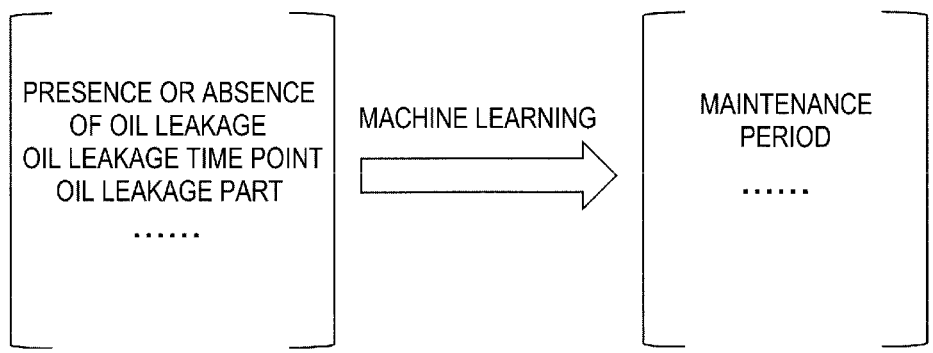
[FIG. 14]
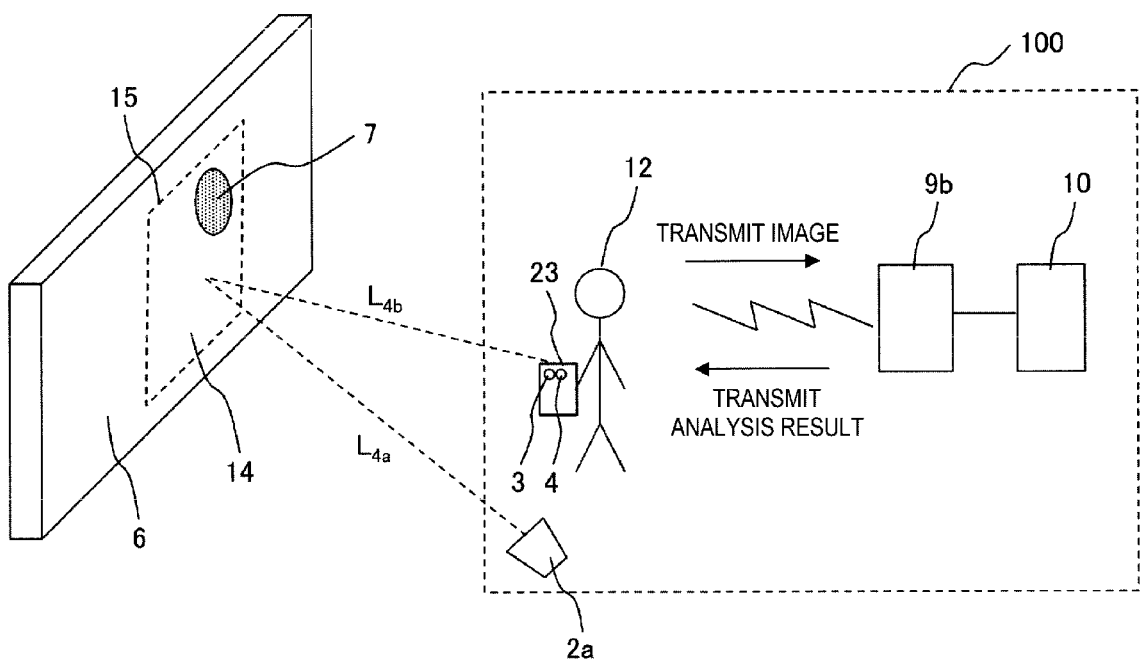

[FIG. 15]
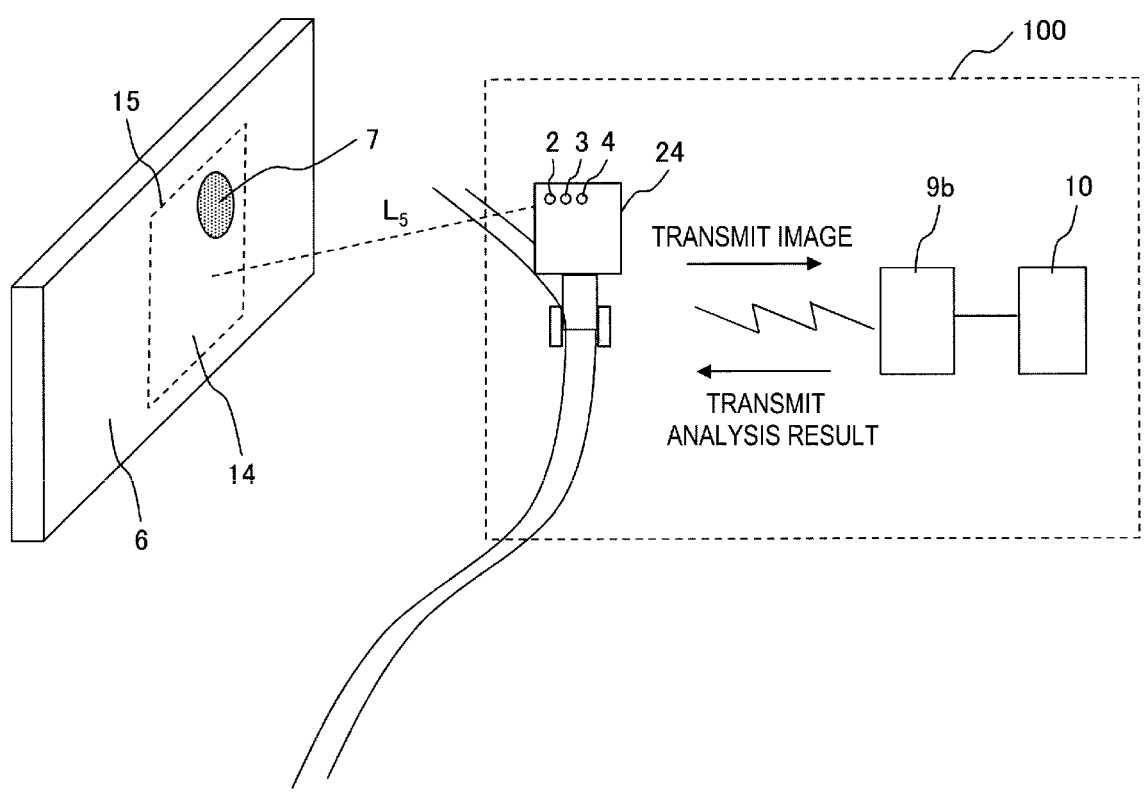

[FIG. 16]
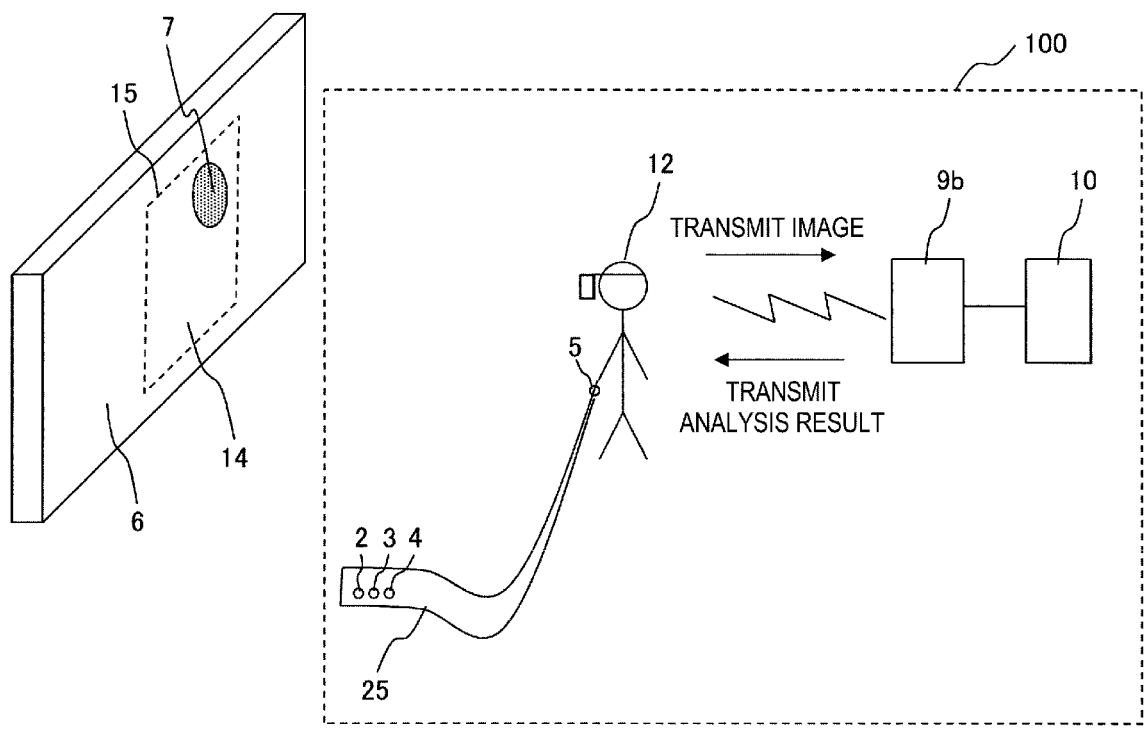
[FIG. 17]
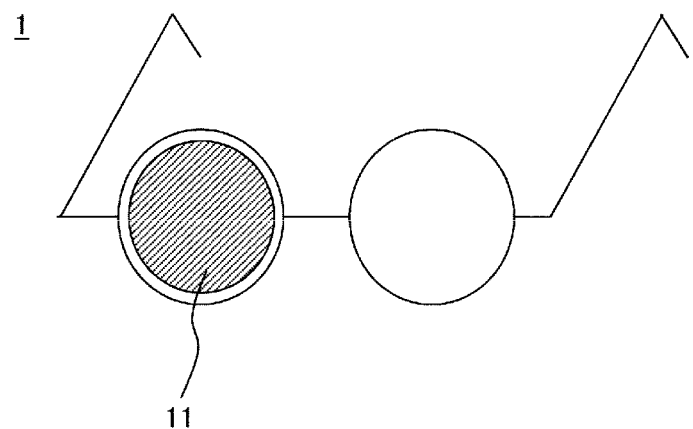

WORK TERMINAL, OIL LEAKAGE DETECTION APPARATUS, AND OIL LEAKAGE DETECTION METHOD

TECHNICAL FIELD

The present invention relates to a work terminal, an oil leakage detection apparatus, and an oil leakage detection method, and particularly to a work terminal, an oil leakage detection apparatus, and an oil leakage detection method suitable for oil leakage detection of an oil-input machine such as a voltage transformer, a capacitor, a hydraulic actuator of a gas insulated switchgear (GIS) and a rectifier.

BACKGROUND ART

In related arts, there is a concern that leaked oil (oil leakage) may occur in an oil-input machine such as an oil storage tank and a voltage transformer due to deterioration or an accident. Since oil leakage may lead to environmental pollution and disasters, a technique for easily detecting oil leakage at an initial stage with high accuracy has been demanded.

PTL 1 describes a related art for solving the problem. PTL 1 describes a technique for detecting oil leakage by detecting fluorescence reflected by leaked oil when an object to be measured (an inspection target such as a voltage transformer) is irradiated with ultraviolet light including an absorption wavelength of the leaked oil. More specifically, PTL 1 describes a technique for calculating lightness and saturation of each pixel of an image captured during ultraviolet light irradiation by performing image processing on each pixel, creating a lightness-saturation graph and a lightness-saturation characteristic curve, and recognizing a pixel deviated from the lightness-saturation characteristic curve by a predetermined value or more as a fluorescent location, that is, an oil leakage location.

CITATION LIST

Patent Literature

PTL 1: JP-A-2016-90560

SUMMARY OF INVENTION

Technical Problem

The technique described in PTL 1 is based on a case assuming that an ultraviolet light source or a color imaging device is fixed at a location where a chance of oil leakage is high, and a distance between the ultraviolet light source or the color imaging device and the inspection target is constant, that is, irradiation intensity of ultraviolet light emitted to the oil-input machine is constant. In the configuration, although oil leakage can be detected with high accuracy, an inspection range of the oil leakage is limited.

Here, in the oil leakage detection technique of PTL 1, a threshold straight line on the lightness-saturation graph serving as a criterion for determining leaked oil adhesion is fixed at a position separated from the lightness-saturation characteristic curve by a certain width in consideration of a variation in lightness and saturation of each pixel, and a location corresponding to pixels above or below the threshold straight line is determined as oil leakage.

However, since the variation in lightness and saturation of each pixel depends on ultraviolet light intensity emitted to the object to be measured, when the ultraviolet light source or the color imaging device is allowed to move freely (for example, disposed in a wearable measurement device) so that various locations of the inspection target can be inspected, the distance between the ultraviolet light source or the color imaging device and the object to be measured changes, and irradiation intensity of the ultraviolet light on the inspection target changes. As a result, the variation width of the lightness and the saturation of each pixel also changes. Therefore, the oil leakage may not be accurately detected by the technique of PTL 1 which is assumed to be used in a situation in which the variation width of lightness and saturation is constant.

The invention is made in view of the above points, and an object thereof is to enable accurate detection of oil leakage even when a distance between an ultraviolet light source or a color imaging device and an inspection target changes.

Solution to Problem

For solving the above problems, the oil leakage detection apparatus of the invention includes a distance measurement unit configured to measure a distance to the oil-input machine, an ultraviolet light source configured to irradiate the oil-input machine with ultraviolet light, a color imaging unit configured to capture an image of the oil-input machine irradiated with ultraviolet light, an image processing unit configured to diagnose oil leakage of the oil-input machine based on the distance measured by the distance measurement unit and the captured image of the color imaging unit, and a display unit configured to display a processed image processed by the image processing unit.

Further, an oil leakage detection method of the invention includes measuring a distance from an oil-input machine, irradiating the oil-input device with ultraviolet light, capturing an image of the oil-input machine irradiated with ultraviolet light, diagnosing oil leakage of the oil-input machine based on the measured distance and the captured image, and displaying a processed image after the diagnosis processing.

Advantageous Effect

According to the invention, oil leakage can be accurately detected even when the distance between the ultraviolet light source or the color imaging device and the inspection target changes.

BRIEF DESCRIPTION OF DRAWINGS

FIG. 1 is a schematic configuration diagram of an oil leakage detection apparatus according to a first embodiment.

FIG. 2 is a schematic configuration diagram of a wearable device according to the first embodiment.

FIG. 4 is a flowchart showing an oil leakage detection processing according to the first embodiment.

FIG. 6 is a schematic configuration diagram showing a wearable device together with a field worker according to a second embodiment.

FIG. 7 is a schematic diagram of a position of a field worker in an oil leakage detection apparatus according to a third embodiment.

FIG. 9 is a principle diagram for diagnosing oil leakage by a lightness-saturation graph according to the third embodiment.

FIG. 10 is a schematic configuration diagram of a wearable device according to a fourth embodiment.

FIG. 11 is a schematic configuration diagram showing the wearable device together with a field worker according to the fourth embodiment.

FIG. 12 is a diagram showing a method of three-dimensionally displaying an inspection target and the field worker according to the fourth embodiment.

FIG. 13 is a schematic principle diagram showing a relationship between time variation and machine learning of a processed image of an oil leakage detection apparatus according to a fifth embodiment.

FIG. 14 is a schematic configuration diagram of an oil leakage detection apparatus according to a sixth embodiment.

FIG. 15 is a schematic configuration diagram of an oil leakage detection apparatus according to a seventh embodiment.

FIG. 16 is a schematic configuration diagram of an oil leakage detection apparatus according to an eighth embodiment.

FIG. 17 is a schematic configuration diagram of a wearable measurement device according to the eighth embodiment.

DESCRIPTION OF EMBODIMENTS

Figure 3A:
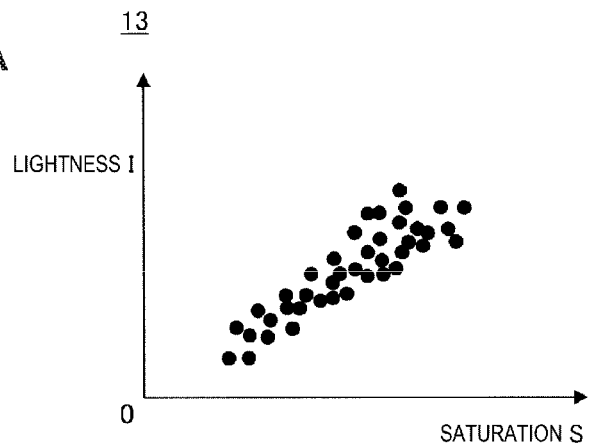
FIGS. 3A to 3C are schematic diagrams of a lightness-saturation graph of the oil leakage detection apparatus according to the first embodiment.

Embodiments of an oil leakage detection apparatus and an oil leakage detection method of the invention will be described below with reference to drawings. In the embodiments, the same components are denoted by the same reference numerals.

First Embodiment

An oil leakage detection apparatus 100 according to the first embodiment of the invention that inspects oil leakage of an oil-input machine is described with reference to FIGS. 1 to 5.

FIG. 1 is a schematic configuration diagram showing a relationship between an inspection target 6 and the oil leakage detection apparatus 100 according to the first embodiment. The inspection target 6 is a large oil-input machine such as a voltage transformer, a capacitor, a hydraulic actuator of a GIS (gas insulated switchgear), or a rectifier. FIG. 1 shows a situation in which a field worker 12 is inspecting oil leakage on one surface of the large oil-input machine.

As shown here, the oil leakage detection apparatus 100 includes a wearable device 1 which is a kind of work terminal operated by the field worker 12, a communication unit 9b that is installed remotely, and an image processing unit 10. Although in the present embodiment, the wearable device 1 and the image processing unit 10 are separated in order to implement functions of the image processing unit 10 by a general-purpose computer such as a personal computer, the image processing unit 10 may be incorporated in the wearable device 1 when a small and high-speed microcomputer can be used. In this case, the communication unit 9b and the like can be omitted.

The wearable device 1 includes an ultraviolet light source 2 that irradiates the inspection target 6 with ultraviolet light, a color imaging unit 3 that images an inspection range 15 on a surface of the inspection target 6 irradiated with the ultraviolet light, a distance measurement unit 4 such as a laser displacement meter that measures a distance between the wearable device 1 and the inspection target 6, a control unit 5 that controls the above, and a display unit 11 that displays a processed image 17 to be described later.

Among the above, for the ultraviolet light source 2, a black light or an LED light source can be used. For the color imaging unit 3, a general-purpose product such as a digital camera or a surveillance camera that images visible light can be used. For the distance measurement unit 4, the laser displacement meter or a GPS receiver can be used. The control unit 5 includes a recording unit 8 that records a captured image 16 of the inspection target 6, and a communication unit 9a that communicates with the communication unit 9b, and controls the ultraviolet light source 2, the color imaging unit 3, and the distance measurement unit 4.

FIG. 2 is a specific example of the wearable device 1. The wearable device 1 shown here is of an eyeglass shape, in which the ultraviolet light source 2 and the color imaging unit 3 are disposed on a right side of the frame and the distance measurement unit 4 and the control unit 5 are disposed on a left side of the frame. By disposing the ultraviolet light source 2, the color imaging unit 3, and the distance measurement unit 4 in such a proximate manner, a region irradiated with the ultraviolet light by the ultraviolet light source 2 can substantially coincide with a region imaged by the color imaging unit 3. When the distance measurement unit 4 is a laser displacement meter, an irradiation position of a laser beam can be set within a range of the ultraviolet light irradiation region or the imaging region, and a distance from the ultraviolet light source 2 or the color imaging unit 3 to the inspection target 6 can be measured with sufficient accuracy.

In a preferable configuration in the proximate manner, the distance measurement unit 4 is disposed on the same right frame as the ultraviolet light source 2 and the color imaging unit 3 in order to further increase processing accuracy of FIGS. 3 and 4 to be described later. However, there is no big problem even if the ultraviolet light source 2 and the color imaging unit 3 are disposed on the right frame and the distance measurement unit 4 is disposed on the left frame separately as shown in FIG. 2, since a distance between the left and right frames of the wearable device 1 is sufficiently small as compared with a distance between the inspection target 6 and the field worker 12.

In the wearable device 1 according to the present embodiment, the display unit 11 is disposed on a right lens. If the display unit 11 is a transflective display, the processed image 17 is displayed on the display unit 11 when received from the image processing unit 10. When no processed image is received, the display unit 11 can be transparent.

With the configuration exemplified in FIGS. 1 and 2, the oil leakage detection apparatus 100 according to the present embodiment can perform oil leakage diagnosis by the image processing unit 10 installed remotely based on the captured image 16 of the color imaging unit 3 and the measured distance of the distance measurement unit 4, and display the processed image 17 processed by the image processing unit 10 on the display unit 11 of the wearable device 1.

Figure 5A:
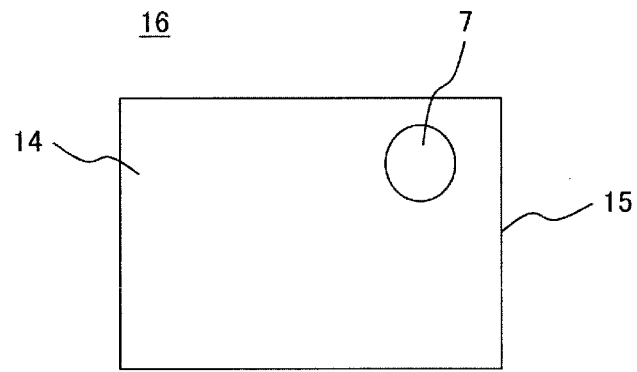
FIGS. 5A and 5B are diagrams showing an example of a captured image and a processed image in the oil leakage detection apparatus according to the first embodiment.
Figure 5B:
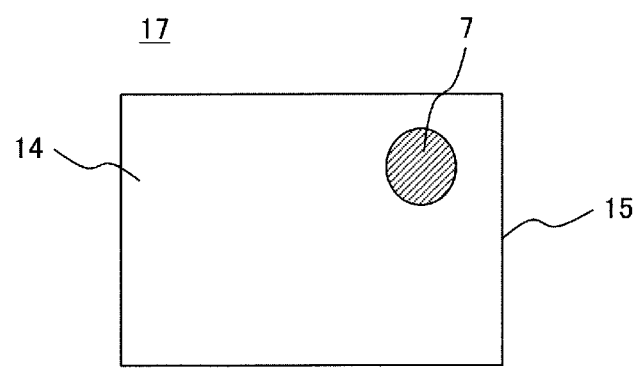

FIG. 5 is a comparison diagram of the captured image 16 captured by the color imaging unit 3 and the processed image 17 displayed on the display unit 11. In the captured image 16 of FIG. 5(a), a leaked oil adhesion portion 7 exists on an upper-right side. When the oil is colorless or in a color of the same system as a leaked oil non-adhesion portion 14, it is difficult to identify the leaked oil adhesion portion 7 for a non-skilled field worker. On the other hand, in the processed image 17 of FIG. 5(b), since the leaked oil adhesion portion 7 is emphasized by hatching processing, flashing processing, coloring processing, or the like, the leaked oil adhesion portion 7 can be easily identified even by a non-skilled field worker.

In this manner, the display unit 11 of the wearable device 1 according to the present embodiment displays the processed image 17 in which the leaked oil adhesion portion 7 is emphasized in a form of coloring or the like based on a screen (captured image 16) that is the same as a screen seen by eyes. Accordingly, with the field worker 12 wearing the wearable device 1 simply moving to a place where it is desired to confirm presence or absence of oil leakage and looking in a direction of the inspection target 6, an oil leakage diagnosis result by the image processing unit 10 is displayed on the display unit 11. Therefore, it is possible to quickly and accurately know the presence or absence of oil leakage and a place of oil leakage even for a non-skilled field worker, and it is possible to accurately determine whether precise inspection or maintenance work is necessary.

As described above, in the image processing unit 10 according to the present embodiment, a general computer such as a personal computer is used. The computer can store related information of the inspection target 6 and, in addition to an image processing function to be described later, can also prompt the non-skilled field worker to move to a place where a chance of oil leakage is high and inspection is necessary.

Next, an image processing method by the image processing unit 10 will be described in detail with reference to FIG. 3.

FIG. 3(a) shows an example in which lightness I and saturation S calculated from each pixel of the captured image 16 captured by the color imaging unit 3 during an oil leakage inspection of the inspection target 6 are plotted on a lightness-saturation graph 13 in which a horizontal axis represents saturation and a vertical axis represents lightness.

Figure 3B:
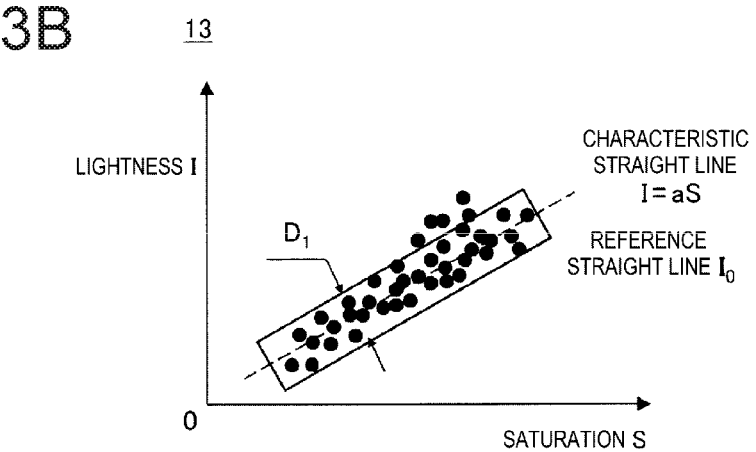

FIG. 3(b) shows an example in which a lightness-saturation characteristic straight line I=aS of the inspection target 6 itself and a variation width D are drawn based on FIG. 3(a) and the like. A method for obtaining the above will be described later with reference to FIG. 4.

Figure 3C:
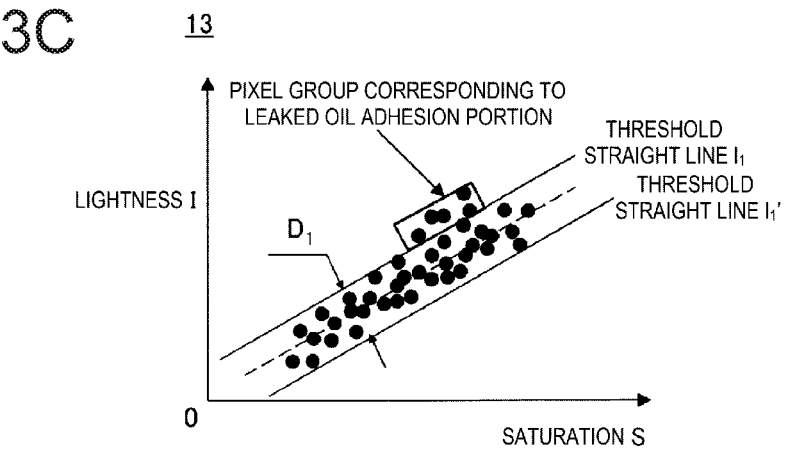

FIG. 3(c) shows an example in which the presence or absence of oil leakage on the surface of the inspection range 15 is identified based on an upper threshold straight line $I_1$ and a lower threshold straight line $I_1'$ with reference to the lightness-saturation characteristic straight line I=aS in FIG. 3(b). Specifically, a part corresponding to a pixel group whose lightness I is higher than the upper threshold straight line $I_1$ or lower than the lower threshold straight line $I_1'$ is determined as the leaked oil adhesion portion 7. FIG. 3(c) exemplifies a case where a pixel group higher than the upper threshold straight line $I_1$ exists, and a pixel group lower than the lower threshold straight line $I_1'$ does not exist.

Here, generally, insulating oil of a voltage transformer or the like has a characteristic of emitting fluorescence when irradiated with ultraviolet light. Since the ultraviolet light source 2 such as black light also emits visible light in addition to ultraviolet light, when the leaked oil adhesion portion 7 exists in the captured image 16, both reflection of ultraviolet light and reflection of visible light are observed. The reflected light basically is diffuse-reflected except for a case where the surface of the inspection target 6 is a mirror surface.

The image processing unit 10 calculates the saturation S and the lightness I of each pixel using values of R (Red), G (Green), and B (Blue) of each pixel corresponding to the surface of the inspection range 15 in the captured image 16.

Equations 1 and 2 are known as formulas for calculating the saturation S and the lightness I.

$$\text{SATURATION}(S) = \sqrt{R^2 + G^2 + B^2 - GR - BR - GB} \quad \text{(Equation 1)}$$

$$\text{LIGHTNESS}(I) = \tfrac{1}{3}R + \tfrac{1}{3}G + \tfrac{1}{3}B \quad \text{(Equation 2)}$$

The lightness-saturation graph 13 in FIG. 3(a) can be created by using the lightness I and the saturation S of each pixel calculated here.

When diffuse reflection occurs in the leaked oil non-adhesion portion 14 of the inspection target 6, the lightness-saturation characteristic straight line I=aS indicating the relationship between the saturation S and the lightness I follows a following Equation 3.

$$I = aS = \frac{\tfrac{1}{3}R_0 + \tfrac{1}{3}G_0 + \tfrac{1}{3}B_0}{\sqrt{R_0^2 + G_0^2 + B_0^2 - G_0 R_0 - B_0 R_0 - G_0 B_0}} S \quad \text{(Equation 3)}$$

Here, a is a constant, $R_0$, $B_0$, and $G_0$ are values of R, G, and B in the leaked oil non-adhesion portion 14 of the inspection target 6. When a surface color of the inspection target 6 and incident light are constant, the saturation S and the lightness I change while maintaining a proportional relationship of Equation 3 due to changes in irradiation light of each point in the inspection range 15 and an imaging angle relative to the color imaging unit 3.

Values of the lightness I has a variation width even for the same value of the saturation S due to surface roughness of the leaked oil non-adhesion portion 14 of the inspection target 6, intensity of the incident light, and uneven spatial distribution of the incident light. In PTL 1, the variation width D may be a constant value as long as the distance between the ultraviolet light source or the color imaging device and the inspection target is fixed. However, in the present embodiment, the wearable device 1 is assumed to be wore by the field worker 12, and the field worker 12 moves around the inspection target 6 freely. Accordingly, the distance between the ultraviolet light source 2 or the color imaging unit 3 and the inspection target 6 is not constant, and the intensity of the incident light reaching the inspection range 15 of the inspection target 6 changes depending on the distance. Since the variation width D changes due to such a change in incident light intensity, it is necessary to adjust the variation width D in accordance with the change in the incident light intensity.

Next, the oil leakage diagnosis process according to the present embodiment will be described in more detail using the flowchart of FIG. 4.

First, in STEP 1, the inspection range 15 on the surface of the inspection target 6 is irradiated with the laser beam from the laser displacement meter which is a kind of the distance measurement unit 4. A distance between the wearable device 1 and the inspection range 15 obtained here is hereinafter referred to as a distance $L_1$.

In STEP 2, the laser displacement meter is turned off.

In STEP 3, a relational expression (A=K/L) of irradiation intensity A and a distance L of the ultraviolet light source 2 is called out from a database in the image processing unit 10 (K is a predetermined constant).

In STEP 4, based on the distance $L_1$ obtained in STEP 1 and A=K/L obtained in STEP 3, a central intensity $A_1$=K/$L_1$ of the incident light falling in the inspection range 15 after the distance $L_1$ is calculated.

In STEP 5, a relational expression (D=αA) of the variation width D and the irradiation light intensity A of the ultraviolet light source 2 is called out from the database in the image processing unit 10 (α is a predetermined constant). Since the relational expression is different depending on a surface state, it is necessary to create a relationship in accordance with each surface state in advance and store the relationship in the image processing unit 10.

In STEP 6, when the incident light falls in the inspection range 15 at the distance $L_1$ from the ultraviolet light source 2, the variation width $D_1$=α$A_1$=αK/$L_1$ of each pixel of leaked oil non-adhesion portion 14 is calculated and stored in the image processing unit 10. As is obvious from the equation, an inverse proportional relationship exists in which the larger the distance $L_1$, the smaller the variation width $D_1$ is.

In STEP 7, the inspection target 6 is irradiated with ultraviolet light of the ultraviolet light source 2, and the inspection of the inspection range 15 is started.

In STEP 8, the inspection range 15 irradiated with the ultraviolet light is captured by the color imaging unit 3, and the obtained captured image 16 is transmitted to the image processing unit 10. An example of the captured image 16 is shown in FIG. 5(a). Based on the received captured image 16, the image processing unit 10 calculates the saturation S and the lightness I from R, G, and B of each pixel in the inspection range 15 based on Equations 1 and 2, and creates the lightness-saturation graph 13 exemplified in FIG. 3(a).

In STEP 9, a point group corresponding to the leaked oil non-adhesion portion 14 is identified from a point group in the lightness-saturation graph 13 of FIG. 3(a) by using the variation width $D_1$ obtained in STEP 6, and the characteristic straight line I=aS is drawn by performing a processing using a least-square method on the point group corresponding to the leaked oil non-adhesion portion 14.

The processing in STEP 9 is performed in more detail as follows. That is, first, in the point group in the lightness-saturation graph 13 of FIG. 3(a), a point group having a minimum lightness value is selected for each saturation value. Next, a reference straight line $I_0$ is created using the selected point group. For example, arbitrary two points are sequentially selected from the selected point group, and reference straight line candidates $I_{0a}$, $I_{0b}$ . . . $I_{0n}$ are created. Then, one having a smallest inclination in the reference straight line candidates is registered as the reference straight line $I_0$ (FIG. 3(b)). Finally, a point group fitting in the variation width $D_1$ in a direction where the lightness is larger than the straight line $I_0$ is selected as a point group corresponding to the leaked oil non-adhesion portion 14, and the characteristic straight line I=aS is calculated by performing a processing by the least-square method on the point groups.

In STEP 10, the upper threshold straight line $I_1$ and the lower threshold straight line $I_1'$ are set at distances $D_1$/2 from the characteristic straight line I=aS (FIG. 3 (c)). Here, although the threshold straight lines are set at positions separated from the characteristic straight line I=aS by [$D_1$/2], a value of the denominator may be replaced with an appropriate value as long as the numerator includes the variation width $D_1$.

In STEP 11, a pixel group corresponding to a point group above the upper threshold straight line $I_1$ or a point group lower than the lower threshold straight line $I_1'$ is determined as the leaked oil adhesion portion 7. As shown in FIG. 5(b), the processed image 17 (for example, FIG. 5(b)) in which the leaked oil adhesion portion 7 is emphasized by hatching or the like is generated.

In STEP 12, the processed image 17 which is performed hatching or the like on the leaked oil adhesion portion 7 is transmitted from the image processing unit 10 to the wearable device 1 and is displayed on the display unit 11.

In STEP 13, the field worker 12 confirms the processed image 17 and, if the leaked oil adhesion portion 7 exists, performs precise inspection and maintenance work in the vicinity thereof.

In STEP 14, although a series of processings is completed, when another location needs to be inspected, the field worker 12 moves to the location and repeats the processing of STEP 1 to STEP 13 to perform an inspection at the other location.

Although an example in which the laser beam is turned off is described in STEP 2, when the variation width D or the captured image is to be appropriately updated, the laser beam or the ultraviolet light may remain irradiation. In addition, oil leakage can be detected normally even if a part of an order of each STEP in the flowchart is moved back or forth within a range where all necessary information can be acquired.

In addition, a mark may also be pasted on an image of the same part captured when the ultraviolet light is not emitted.

As described above, with the oil leakage detection apparatus according to the present embodiment, an ultraviolet light source and a color imaging unit are disposed in a wearable device, even when a distance between the ultraviolet light source or the color imaging unit and an inspection target changes with a movement of a field worker wearing the wearable device, oil leakage can be detected with high accuracy even if leaked oil is colorless or the like without complicating the oil leakage detection apparatus. Accordingly, freedom degree of oil leakage detection can be significantly increased as compared with an oil leakage detection apparatus in the related art in which an ultraviolet light source or a color imaging unit is fixed.

Further, in the oil leakage detection apparatus according to the present embodiment, since it is possible to issue an instruction about which part of the inspection target should be inspected via the wearable device, the inspection can be performed by a non-skilled field worker in a procedure equivalent to that of a skilled field worker. Although FIG. 1 shows an example in which the field worker wears a wearable device, an effect equivalent to that described above can be implemented by a configuration in which an ultraviolet light source, a color imaging unit, a distance measurement unit, and the like are disposed on a robot or a drone and the robot or the like is operated according to instructions from a general-purpose computer.

In the above embodiment, although an oil leakage detection apparatus for detecting oil leakage of an oil-input machine is described as an example, the invention can also be generally applied to an inspection device that identifies a substance that emits fluorescence and a substance that does not emit fluorescence.

Second Embodiment

Next, the oil leakage detection apparatus 100 according to the second embodiment will be described with reference to FIG. 6. Repetitive descriptions of common points as in the first embodiment are omitted.

In the first embodiment, the wearable device 1 wore on a head includes the ultraviolet light source 2, the color imaging unit 3, the distance measurement unit 4, the control unit 5, and the display unit 11, which may also be disposed in a distributed manner.

For example, as shown in FIG. 6, the wearable device 1 may be separated into a head unit 1a and a body unit 1b, and the ultraviolet light source 2, the distance measurement unit 4, and the control unit 5 may be disposed on the body unit 1b. As a result, since only the color imaging unit 3 and the display unit 11 are disposed on the head unit 1a, the head unit 1a can be significantly reduced in weight and a load on a neck or the like of the field worker 12 can be significantly reduced.

As described above, in the oil leakage detection apparatus according to the present embodiment, a similar effect as that of the first embodiment can be obtained undoubtedly, and a weight of the head unit 1a of the wearable device 1 can be reduced. When the body unit 1b of FIG. 6 is adopted, a relatively large image processing unit 10 may be disposed inside the body unit 1b, and the communication unit 9b in FIG. 1 may be omitted.

Third Embodiment

Next, the oil leakage detection apparatus 100 according to the third embodiment will be described with reference to FIGS. 7 to 9. Repetitive descriptions of common points as in the above-described embodiments are omitted.

In the first embodiment, the captured image 16 that captures images from one place is used when presence or absence of oil leakage in the predetermined inspection range 15 of the inspection target 6 is inspected. However, in the present embodiment, accuracy of oil leakage inspection is improved by using a plurality of superimposed captured images 16 captured the same inspection range 15 from different positions.

For example, as shown in FIG. 7, the same part of the inspection target 6 is captured from two locations, which are a position P1 having a distance $L_1$ from the inspection target 6, and a position P2 having a distance $L_2$ from the inspection target 6. In order to inspect the presence or absence of oil leakage by using the captured images 16 captured in multiple directions, it is necessary to superimpose the same position of the images as a preprocessing. There are various methods for superimposing images, and one method among them will be described below.

Figure 8A:
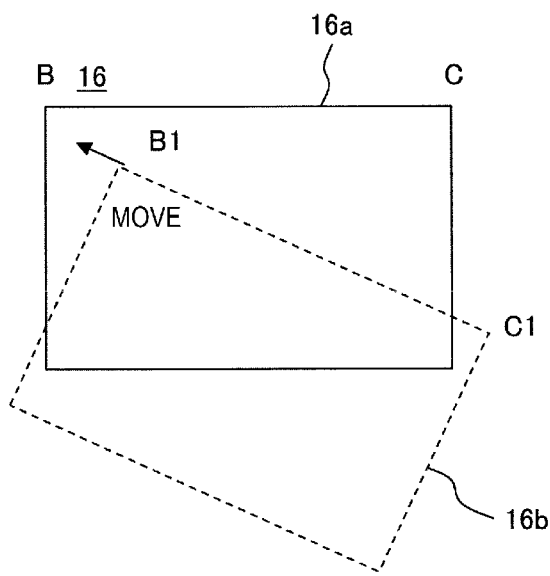
FIGS. 8A and 8B are schematic diagrams of a method of superposing captured images of the oil leakage detection apparatus according to the third embodiment.
Figure 8B:
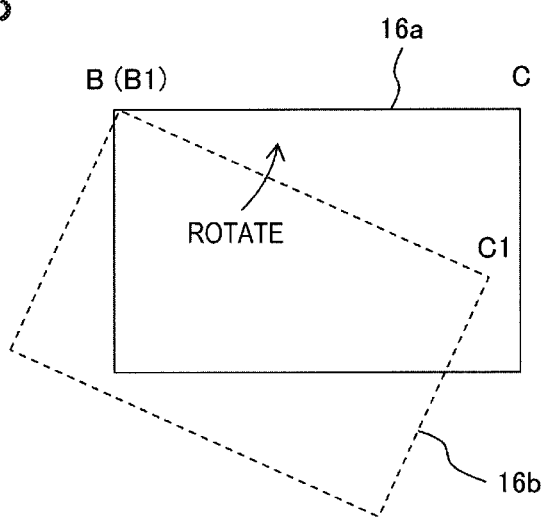

FIG. 8 is a method of superimposing the captured images 16 captured from two directions. First, the image processing unit 10 extracts feature points B and C from a first captured image 16a and extracts feature points B1 and C1 corresponding to the same positions from a second captured image 16b. Subsequently, as shown in FIG. 8(a), the second captured image 16b is moved so that the feature point B1 is superimposed on the feature point B. Next, as shown in FIG. 8(b), the second captured image 16b is rotated so that the feature point C1 is superimposed on the feature point C. By the series of processings, the first captured image 16a and the second captured image 16b can be superimposed. A method of performing image recognition by applying a mark on the inspection target 6 or other methods known in the art may be used as a method for extracting the feature points B and C.

Further, the image processing unit 10 identifies the leaked oil adhesion portion 7 by using the superimposed captured images 16a and 16b. A specific method is shown in FIG. 9. In this manner, a pixel group 18 estimated to have leaked oil adhesion is obtained from a lightness-saturation graph 13a based on the captured image 16a from the position P1. In addition, a pixel group 19 estimated to have leaked oil adhesion is obtained from a lightness-saturation graph 13b based on the captured image 16b from the position P2. Then, an AND condition of the pixel group 18 and the pixel group 19 is taken, and a pixel group 20 (hatched pixel group), which is a product set of the pixel group 18 and the pixel group 19 is identified as leaked oil.

As described above, in the present embodiment, since the leaked oil is detected using the two captured images 16a and 16b captured from different measurement positions, oil leakage diagnosis accuracy can be improved as compared with the first embodiment.

Although imaging from two directions has been described as an example in the present embodiment, the same effect can be obtained by imaging from multiple directions.

Fourth Embodiment

Next, the oil leakage detection apparatus 100 according to the fourth embodiment will be described with reference to FIG. 10. Repetitive descriptions of common points as in the above-described embodiments are omitted.

In the configuration of the first embodiment, the distance measurement unit 4 such as a laser displacement meter is used to measure the distance between the wearable device 1 and the inspection target 6. However, in the present embodiment, the distance between the wearable device 1 and the inspection target 6 can be measured by using a GPS receiver.

FIG. 10 shows the wearable device 1 according to the present embodiment, which includes an angle measurement camera 21 and a GPS receiver 22 instead of the color imaging unit 3 and the distance measurement unit 4 in the first embodiment.

Although the GPS receiver 22 measures the distance between the wearable device 1 and the inspection range 15 similarly as the position measuring device 4 in the first embodiment, as shown in FIG. 11, the distance that can be measured by the GPS receiver 22 is a vertical distance $L_0$ from the inspection target 6, and a distance L3 from the inspection range 15 cannot be directly measured. Therefore, in the present embodiment, an angle θ between a direction in which the wearable device 1 is facing and the vertical direction is obtained from the angle measurement camera 21, and the distance $L_3=L_0/\cos θ$ from the inspection range 15 is calculated by using the angle θ. The irradiation intensity A of the ultraviolet light falling in the inspection range 15 is calculated by using the distance $L_3$.

The angle measurement camera 21 is not necessarily used for angle measurement, and another device capable of measuring the angle may be mounted on the wearable device 1.

Further, when the GPS receiver 22 is mounted on the wearable device 1, a relative position to the inspection target 6 whose place and shape are known is obtained. Accordingly, a three-dimensional diagnosis of an oil leakage state of the inspection target 6 can be performed using the positional relationship.

As a specific diagnosis method, as shown in FIG. 12, first, a three-dimensional image of the inspection target 6 is drawn in advance and stored in the image processing unit 10. From position information obtained from the GPS receiver 22, the field worker 12 obtains information indicating which surface of the inspection target 6 is to be diagnosed. For example, the field worker 12 diagnoses one surface of the inspection target 6 when the field worker 12 is at a position P3. As a diagnosis result, for example, leaked oil adhesion portions 7a and 7b may be displayed on a corresponding surface of the inspection target 6. A leaked oil adhesion portion 7c indicated by a dotted line is leaked oil existing on an uninspected surface and is not recorded in the three-dimensional image at a current time point since the leaked oil adhesion portion 7c has not yet been grasped. The leaked oil adhesion portion 7c is registered in the three-dimensional image after an oil leakage diagnosis of the corresponding surface.

As described above, in the present embodiment, the same effect as that of the first embodiment can be obtained undoubtedly, and the oil leakage can be diagnosed with high accuracy by using the GPS receiver 22. In addition, the oil leakage state of an inspection target can be three-dimensionally stored and displayed.

Fifth Embodiment

Next, the oil leakage detection apparatus 100 according to the fifth embodiment will be described with reference to FIG. 13. Repetitive descriptions of common points as in the above-described embodiments are omitted.

The oil leakage detection apparatus 100 according to the present embodiment machine-learns a temporal change of oil leakage in the predetermined inspection range 15 and obtains information such as a maintenance period.

As shown in FIG. 13, in the present embodiment, the captured image 16 is acquired at each time of $t_1$ to $t_n$, and is stored in the image processing unit 10. Then, information such as a change in "presence or absence of oil leakage", "oil leakage time point", and "oil leakage part" is extracted from the same part of the stored captured image 16, and a next oil leakage part, oil leakage amount and the like are predicted by machine learning in which the information is set as input data. As a result of such machine learning, it is possible to propose a maintenance period and the like of the inspection target 6 such as an oil-input machine.

As described above, in the oil leakage detection apparatus according to the present embodiment, not only the oil leakage detection of the inspection target 6 but also the management of the maintenance period of the oil-input machine by using machine learning can be implemented.

Sixth Embodiment

Next, the oil leakage detection apparatus 100 according to the sixth embodiment will be described with reference to FIG. 14. Repetitive descriptions of common points as in the above-described embodiments are omitted.

In the oil leakage detection apparatus 100 according to the first embodiment, the wearable device 1 including the ultraviolet light source 2, the color imaging unit 3, and the distance measurement unit 4 is used. However, in the oil leakage detection apparatus according to the present embodiment, instead of the wearable device 1, a smart terminal 23 including an independently operable ultraviolet light source device 2a, the color imaging unit 3, and the distance measurement unit 4 can be used as a work terminal. The smart terminal 23 is a terminal having an enough size for the field worker 12 to carry. For example, the distance measurement unit 4 is added next to the color imaging unit 3 originally provided in a commercially available terminal such as a smartphone, a tablet or the like. The ultraviolet light source device 2a in the present embodiment is disposed at a constant distance $L_{4a}$ from the inspection target 6, and emits an ultraviolet light ray to a desired range of the inspection target 6 during inspection.

Here, as shown in FIG. 14, a distance from the inspection range 15 measured by the distance measurement unit 4 of the smart terminal 23 is defined as a distance $L_{4b}$. At the time, in the oil leakage detection apparatus 100 according to the present embodiment, first, a relational expression (for example, $B=K_1/L$, $K_1$ is a predetermined constant) of an intensity B and the distance L of reflected light from the leaked oil non-adhesion portion 14 in the inspection range 15 is called out from a database in the image processing unit 10, and an intensity $B_1=K_1/L_{4b}$ of the reflected light when the leaked oil non-adhesion portion 14 in the inspection range 15 is imaged from a position at the distance $L_{4b}$ is calculated. Further, the variation width $D_1=\alpha B_1=\alpha K_1/L_{4b}$ of each pixel of the leaked oil non-adhesion portion 14 is calculated and stored in the image processing unit 10. The threshold straight line $I_1$ is determined by using the variation width $D_1$ calculated in such a procedure. By doing so, as in the present embodiment, the oil leakage can be detected similarly as in the above embodiments even with the smart terminal 23 and the ultraviolet light source device 2a.

In the oil leakage detection apparatus 100 exemplified in FIG. 14, the distance $L_{0a}$ of the inspection range 15 and the ultraviolet light source device 2a is fixed, the distance $L_{4b}$ between the inspection range 15 and the smart terminal 23 is changed by the field worker 12, and thereby, oil leakage is detected. However, in the oil leakage detection apparatus 100, if the ultraviolet light source 2a including the distance measurement unit 4 is used, oil leakage can also be detected by fixing the distance $L_{4b}$ of the inspection range 15 and the smart terminal 23, and changing the distance $L_{4a}$ between the inspection range 15 and the ultraviolet light source device 2a by the field worker 12.

By using these devices, accuracy of oil leakage detection may be improved by irradiation from multiple directions or imaging from multiple directions as in the third embodiment.

Seventh Embodiment

Next, the oil leakage detection apparatus 100 according to the seventh embodiment will be described with reference to FIG. 15. Repetitive descriptions of common points as in the above-described embodiments are omitted.

In the above-described embodiments, a distance between the wearable device 1, the smart terminal 23, or the like and the inspection range 15 of the inspection target 6 is changed by the field worker 12. That is, in the above-described embodiments, field work by the field worker 12 is necessary when performing oil leakage detection.

In contrast, in the oil leakage detection apparatus 100 according to the present embodiment, an autonomous moving apparatus 24 that is autonomously movable using wheels or legs in the vicinity of the inspection target 6 is provided with the ultraviolet light source 2, the color imaging unit 3, and the distance measurement unit 4. By using the autonomous moving apparatus 24 as a work terminal, oil leakage in the desired inspection range 15 of the inspection target 6 can be detected without visiting the vicinity of the inspection target 6 by the field worker 12.

FIG. 15 schematically shows the oil leakage detection apparatus 100 according to the present embodiment, and shows the autonomous moving apparatus 24 traveling on a track such as a rail installed in advance around the inspection target 6. With the autonomous moving apparatus 24 automatically controlled or remotely controlled by an operator and the desired inspection range 15 of the inspection target 6 imaged, oil leakage can be detected similarly as in the above embodiments by using any of the above oil leakage detection methods.

In a configuration exemplified in FIG. 15, although the autonomous moving apparatus 24 includes the ultraviolet light source 2, the color imaging unit 3, and the distance measurement unit 4, it is not necessary to provide all of the above in the autonomous moving apparatus 24, and any combination of the autonomous moving apparatus 24 in the present embodiment and the above-described embodiments may be used. For example, in the sixth embodiment, the independently operable ultraviolet light source device 2a and the autonomous moving apparatus 24 without the ultraviolet light source 6 are combined to constitute the oil leakage detection apparatus 100. Further, in FIG. 15, although the autonomous moving apparatus 24 traveling on the fixed rail is exemplified, a movement range of the autonomous moving apparatus 24 is not required to be fixed and the autonomous moving apparatus may be moved freely in the vicinity of the inspection target 6.

Eighth Embodiment

Next, the oil leakage detection apparatus 100 according to the eighth embodiment will be described with reference to FIGS. 16 and 17. Repetitive descriptions of common points as in the above-described embodiments are omitted.

As shown in FIG. 17, in the present embodiment, in the configuration of the oil leakage detection apparatus 100, only the display unit 11 is disposed on the wearable device 1, so that the field worker 12 can confirm a measurement result via the display unit 11. As shown in FIG. 16, in the configuration of the oil leakage detection apparatus 100, the ultraviolet light source 2, the color imaging unit 3, the distance measurement unit 4 such as a laser displacement meter, and the control unit 5 are disposed on a moving device 25 separated from the wearable device 1. The moving device 25 is flexible and elongated, which incorporates a flexible signal line such as an optical fiber. The control unit 5 is disposed on one end side thereof, and the ultraviolet light source 2, the color imaging unit 3, and the distance measurement unit 4 are disposed on the other end side thereof. Then, the field worker 12 grips a control unit 5 side of the moving device 25, and directs a distal end portion on which the color imaging unit 3 and the like are disposed to the inspection range 15 of the inspection target 6 to perform an oil leakage detection operation.

By using the flexible moving device 25, a distal end side (a color imaging unit 3 side) of the moving device 25 can be inserted into a location where imaging is difficult in the configurations of the embodiments described above, such as a lower portion or a gap of the inspection target 6, and detection of oil leakage can be executed in a wider range. In addition, since the ultraviolet light source 2 and the color imaging unit 3 are disposed in a proximate manner, it is possible to detect oil leakage with high sensitivity even if the ultraviolet light source 2 having weak intensity is used.

The control unit 5 may be disposed on the wearable device 1. The moving device 25 may be an autonomous moving apparatus as described in the eighth embodiment.

The wearable device 1 in the present embodiment may be a commercially available smart terminal such as a smartphone or a tablet.

REFERENCE SIGN LIST

100 oil leakage detection apparatus
1 wearable device
1a head unit
1b body unit
2 ultraviolet light source
3 color imaging unit
4 distance measurement unit
5 control unit
6 inspection target
7, 7a, 7b, 7c leaked oil adhesion portion
8 recording unit
9a, 9b communication unit
10 image processing unit
11 display unit
12 field worker
13, 13a, 13b, 13c, lightness-saturation graph
14 leaked oil non-adhesion portion
15 inspection range
16, 16a, 16b captured image
17 processed image
18, 19, 20 pixel group
21 angle measurement camera
22 GPS receiver
23 smart terminal
24 autonomous moving apparatus
25 moving device
I lightness
S saturation
D variation width
$I_1, I_1'$ threshold straight line
$L, L_0, L_1, L_2, L_3, L_{4a}, L_{4b}, L_5$ distance

The invention claimed is:

1. A work terminal used in an oil leakage detection apparatus that detects oil leakage in an oil-input machine, the work terminal comprising:
   a distance measurement unit configured to measure a distance to the oil-input machine;
   an ultraviolet light source configured to irradiate the oil-input machine with ultraviolet light;
   a color imaging unit configured to capture an image of the oil-input machine;
   a communication unit configured to transmit distance data acquired by the distance measurement unit and image data acquired by the color imaging unit;
   an image processing unit is configured to: i) calculate a lightness value and a saturation value of each pixel from a Red value, a Green value, and a Blue value of each pixel of the captured image, ii) plot lightness values and saturation values on a lightness-saturation graph in which a horizontal axis represents saturation and a vertical axis represents lightness, iii) create a lightness-saturation characteristic straight line of the oil-input machine from the lightness-saturation graph, iv) diagnose a part corresponding to a pixel group higher than an upper threshold straight line parallel to the lightness-saturation characteristic straight line or a part corresponding to a pixel group lower than a lower threshold straight line parallel to the lightness-saturation characteristic straight line as oil leakage, and v) sets an interval between the lightness-saturation characteristic straight line and the upper threshold straight line, and an interval between the lightness-saturation characteristic straight line and the lower threshold straight line to be inversely proportional to the distance measured by the distance measurement unit.

2. An oil leakage detection apparatus comprising:
   a distance measurement unit configured to measure a distance to an oil-input machine;

an ultraviolet light source configured to irradiate the oil-input machine with ultraviolet light;

a color imaging unit configured to capture an image of the oil-input machine irradiated with ultraviolet light;

an image processing unit configured to diagnose oil leakage of the oil-input machine based on the distance measured by the distance measurement unit and the captured image of the color imaging unit; and a display unit configured to display a processed image processed by the image processing unit, wherein the image processing unit is configured to
calculate an irradiation intensity of ultraviolet light emitted from the ultraviolet light source to a surface of the oil-input machine by using the distance measured by the distance measurement unit,
calculate a variation width of lightness or saturation of a pixel group corresponding to a leaked oil non-adhesion portion by using the irradiation intensity,
create a lightness-saturation characteristic straight line of the leaked oil non-adhesion portion by using the variation width, and
determine an upper threshold straight line and a lower threshold straight line parallel to the lightness-saturation characteristic straight line by using the variation width.

3. The oil leakage detection apparatus according to claim 2, wherein
the oil leakage detection apparatus includes a wearable device configured to be worn by a field worker, and a computer separated from the wearable device,
the wearable device is provided with the distance measurement unit, the ultraviolet light source, the color imaging unit, the display unit, and a first communication unit, and
the computer is provided with a second communication unit configured to communicate with the first communication unit, and the image processing unit.

4. The oil leakage detection apparatus according to claim 3, wherein
the wearable device includes a head unit configured to be worn on a head of the field worker, and a body unit configured to be worn on a body of the field worker,
the color imaging unit and the display unit are disposed on the head unit, and
the ultraviolet light source and the distance measurement unit are disposed on the body unit.

5. The oil leakage detection apparatus according to claim 2, wherein
the processed image displayed on the display unit is an image in which a leaked oil adhesion portion of the captured image is emphasized.

6. The oil leakage detection apparatus according to claim 2, wherein
the distance measurement unit is a laser displacement meter, and
an irradiation position of a laser beam of the laser displacement meter is within an irradiation range of the ultraviolet light source.

7. The oil leakage detection apparatus according to claim 2, wherein
the image processing unit is configured to
calculate a lightness value and a saturation value of each pixel from a Red value, a Green value, and a Blue value of each pixel of the captured image,
plot lightness values and saturation values on a lightness-saturation graph in which a horizontal axis represents saturation and a vertical axis represents lightness,
create a lightness-saturation characteristic straight line of the oil-input machine from the lightness-saturation graph, and
diagnose a part corresponding to a pixel group higher than an upper threshold straight line parallel to the lightness-saturation characteristic straight line or a part corresponding to a pixel group lower than a lower threshold straight line parallel to the lightness-saturation characteristic straight line as oil leakage.

8. The oil leakage detection apparatus according to claim 7, wherein
the image processing unit sets an interval between the lightness-saturation characteristic straight line and the upper threshold straight line, and an interval between the lightness-saturation characteristic straight line and the lower threshold straight line to be inversely proportional to the distance measured by the distance measurement unit.

9. The oil leakage detection apparatus according to claim 2, wherein
the color imaging unit captures images of the same part of the oil-input machine from different directions, and
the image processing unit extracts an oil leakage part of the oil-input machine based on a plurality of captured images, and diagnoses an overlapping part of a plurality of extracted oil leakage parts as a final oil leakage part.

10. The oil leakage detection apparatus according to claim 2, wherein
the distance measurement unit is a global positioning system receiver, and the color imaging unit is an angle measurement camera.

11. The oil leakage detection apparatus according to claim 2, wherein
the image processing unit marks a diagnosis result of oil leakage on the displayed oil-input machine.

12. The oil leakage detection apparatus according to claim 2, wherein
the color imaging unit captures an image of a temporal change of the oil-input machine,
the image processing unit machine-learns an oil leakage diagnosis result by a captured image at each time point, and
any one of a prediction of a next oil leakage part, a prediction of an oil leakage amount, and a prediction of a maintenance period of the oil-input machine is performed.

13. The oil leakage detection apparatus according to claim 2, wherein
the oil leakage detection apparatus includes a wearable device configured to be worn by a field worker, and a flexible, elongated moving device separated from the wearable device,
the display unit is disposed on the wearable device, and
the distance measurement unit, the ultraviolet light source, and the color imaging unit are disposed on a distal end side of the moving device.

14. An oil leakage detection method comprising:
measuring a distance from an oil-input machine;
irradiating the oil-input device with ultraviolet light;

capturing an image of the oil-input machine irradiated with ultraviolet light; diagnosing oil leakage of the oil-input machine based on the measured distance and the captured image;

displaying a processed image after the diagnosis processing, wherein the diagnosis of oil leakage includes:

calculating a lightness value and a saturation value of each pixel from a Red value, a Green value, and a Blue value of each pixel of the captured image, plotting lightness values and saturation values on a lightness-saturation graph in which a horizontal axis represents saturation and a vertical axis represents lightness, creating a lightness-saturation characteristic straight line of the oil-input machine from the lightness-saturation graph, and diagnosing a part corresponding to a pixel group higher than an upper threshold straight line parallel to the lightness-saturation characteristic straight line or a part corresponding to a pixel group lower than a lower threshold straight line parallel to the lightness-saturation characteristic straight line as oil leakage, wherein an interval between the lightness-saturation characteristic straight line and the upper threshold straight line and an interval between the lightness-saturation characteristic straight line and the lower threshold straight line are set to be inversely proportional to the measured distance.

* * * * *